United States Patent [19]

Reunamäki

[11] Patent Number: 5,137,562
[45] Date of Patent: Aug. 11, 1992

[54] GLASS BENDING MOLD

[75] Inventor: Pauli T. Reunamäki, Tampere, Finland

[73] Assignee: Glassrobots Oy, Tampere, Finland

[21] Appl. No.: 674,355

[22] PCT Filed: Sep. 27, 1989

[86] PCT No.: PCT/FI89/00181
§ 371 Date: Apr. 12, 1991
§ 102(e) Date: Apr. 12, 1991

[87] PCT Pub. No.: WO90/03334
PCT Pub. Date: Apr. 5, 1990

[30] Foreign Application Priority Data

Sep. 28, 1988 [FI] Finland .................................. 884441

[51] Int. Cl.$^5$ .......................................... C03B 23/025
[52] U.S. Cl. .......................................... 65/273; 65/107; 65/287; 65/289
[58] Field of Search ................... 65/107, 273, 287, 289

[56] References Cited

U.S. PATENT DOCUMENTS

| | | | |
|---|---|---|---|
| 2,223,124 | 11/1940 | Owen | 65/289 |
| 2,526,359 | 10/1950 | Jendrisak | 65/289 |
| 4,540,425 | 9/1985 | Bocelli et al. | 65/273 |
| 4,881,962 | 11/1989 | Reunamäki et al. | 65/273 |

Primary Examiner—Joye L. Woodard
Attorney, Agent, or Firm—Larson and Taylor

[57] ABSTRACT

The present invention provides a glass bending mold including at least two vertical template plates mounted in an oven frame by fixing devices. The vertical template plates define the shape of glass bent in the bending mold and include recesses along an upper edge thereof. On top of the templates are laid horizontally extending pipes for supporting glass to be bent. The pipes are received by said recesses in the template plates and are supported by the template plates. One end of each of the pipes extends out of the oven through apertures in one wall of said oven. A lever device moves the pipes back and forth to rock the pipes in the recesses while glass to be bent is lowered on the pipes.

5 Claims, 1 Drawing Sheet

GLASS BENDING MOLD

BACKGROUND OF THE INVENTION

1. Field of the Invention

The present invention relates to the glass bending mold, which is located in an oven, which is heated for softening glass sheets so that when a glass sheet is laid in a horizontal position over the mold, it can with assistance of gravity be bent against the mold and be formed to have a curvature corresponding to the mold.

2. Prior Art

In U.S. Pat. No. 2,223,124 there is presented a method for bending glass sheets in which in the glass sheet to be bent is placed on horizontal runway rolls which are separately supported and spaced apart from each other. When the glass is heated, these rolls are lowered and while lowering the rolls define the desired curvature to which the glass sheet is to be bent. Different ways to guide lowering rolls give different curvatures in bending. To prevent soft glass sheet from bending down between horizontal rolls, the runway of rolls is rotated alternately back and forth during heating and bending and so the glass sheet is moved back and forth along the runway of rolls.

The device described in U.S. Pat. No. 2,223,124 has problems in guiding the of lowering of the rolls which is a difficult operation and has to be done inside the bending oven. Because of the construction of the roller runway, it is also impossible in any simple way to make the size of the mold smaller when bending smaller sizes of glass sheets. A rotating device makes the roller runway even more complex.

SUMMARY OF THE INVENTION

The present invention provides a glass bending mold comprising:

an oven having a frame;

at least two vertical template plates mounted in the frame by fixing devices, the vertical template plates defining the shape of glass bent in the bending mold, the vertical template plates including recesses along an upper edge thereof;

horizontally extending pipes for supporting glass to be bent, the pipes being received by the recesses in the template plate and being supported by the template plates, at least one end of each of the pipes extending out of the oven through apertures in at least one wall of the oven; and levers for moving the pipes back and forth to rock the pipes in the recesses while glass to be bent is lowered on said pipes.

The mold system according to present invention provides a significant improvement over the previously mentioned prior art devices. As a major benefit of a device according to the present invention is that pipe-like elements can easily be rotated back and forth because of the light construction of pipe-like elements.

DETAILED DESCRIPTION OF THE INVENTION

Figure 1:
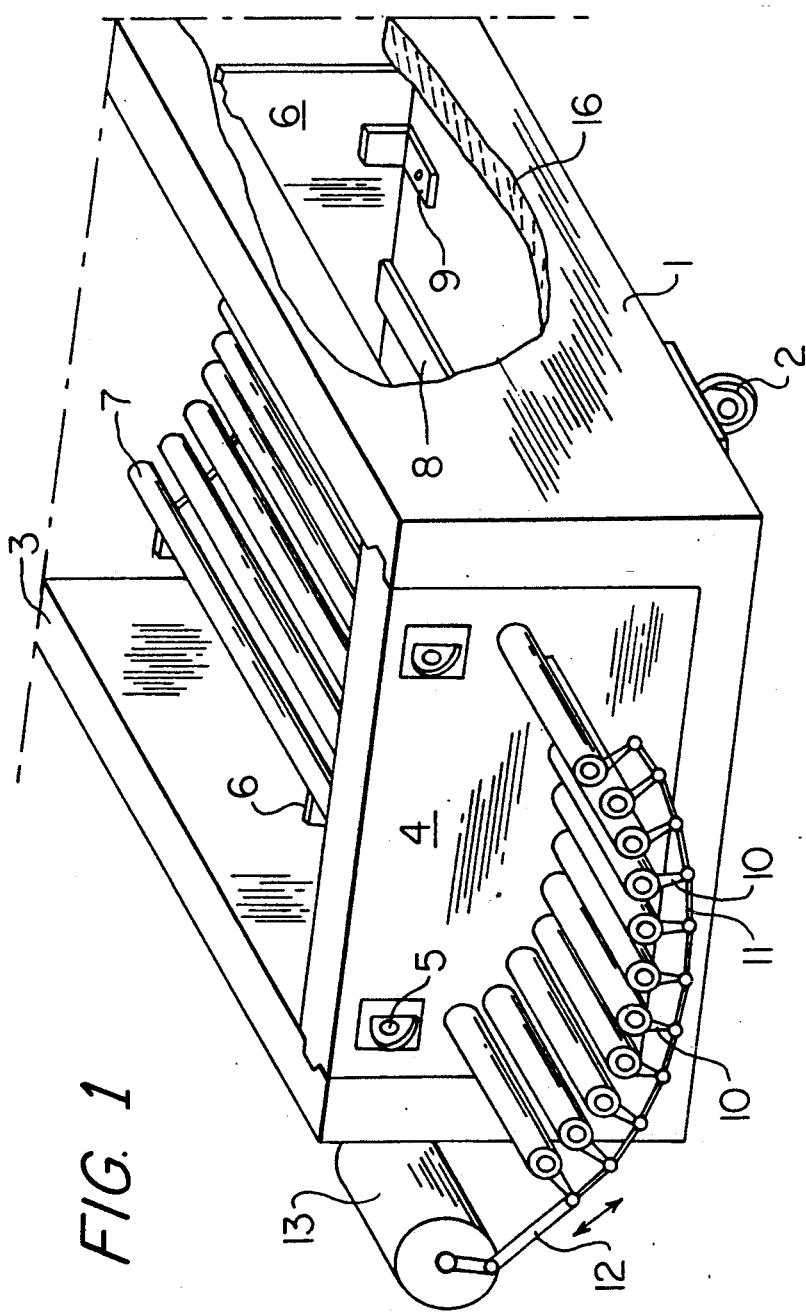
FIG. 1 is a perspective view of a bending mold made according to the invention in which part of the oven is broken away to show interior detail.

In FIG. 1 there is shown an insulator 16 which insulates a lower part 1 of a glass bending oven equipped with wheels. One of the wheels 2 is shown beneath lower part 1. An upper part of the oven (not shown) is laid on the top of lower part 1 on joint surface 3. The glass bending mold consists of horizontal pipes 7, which are laid on template plates 6. Template plates 6 are oriented vertically and they are laid between fixtures 9 mounted in the frame of the mold. Between the fixtures 9 there is located a plane bar 8 which is used to position template plates 6 in a perpendicular direction relative to plane bar 8. Ends of pipes 7 are led out of thee oven through apertures in special plate or wall 4. This plate is equipped with lift eyes 5. The special plate 4 can be lifted out of the oven while still containing the pipes 7. Ends of pipes 7 which are led out of the oven are equipped with levers 10 which are joined together by members 11 located between joint points. Device 13 causes the movement of the levers 10 back and forth with assistance of rod 12.

Figure 2:
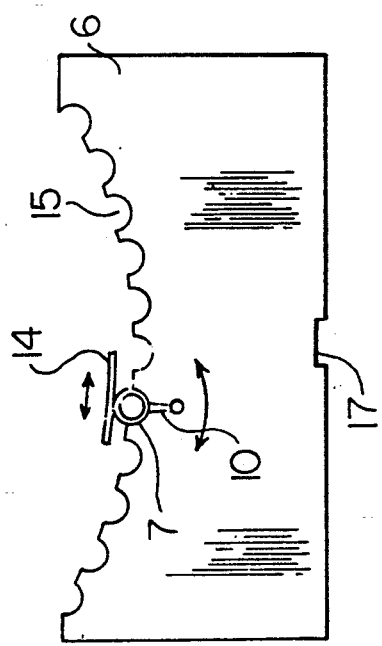
FIG. 2 shows a template plate of the invention defining a bending form.

In FIG. 2 there is shown a template plate and over which is laid a mold pipe 7, which is located in one of formed pipe recesses 15. Recesses 15 are constructed to hold each pipe 7 in its position during oscillating and rocking back and forth caused by the levers 10 acting on the pipes 7. The purpose of the back and forth oscillating movement is to prevent marks in lower surface of glass which can be caused by line-like touching of the lower surface of the glass, when glass has been lowered over the pipes and chilling is starting. Most advantageously, the movement of the glass is about 2–20 mm. Movement is started when chilling of the glass has progressed so that the mold is no longer causing marks in the surface of the glass. Different kinds of bending forms can be made with the same mold pipes 7 by changing the template plates and the special plate 4 according to the form desired. Hole 17 in the lower edge of template plate is used in guiding template plates so that they are aligned.

It should be particularly observed that the template plates can be replaced with balks carried in the ends. When balks are used, the balks have formed surfaces and the pipes 7 are supported and separated from each other by middle members.

While only one embodiment of the present invention has been described in detail herein, various modifications and changes may be applied without departing from the scope of the invention.

I claim:

1. A glass bending mold comprising:

an oven having a frame;

at least two vertical template plates mounted in said frame by fixing means, said vertical template plates defining the shape of glass bent in the bending mold, said vertical template plates including recesses along an upper edge thereof;

horizontally extending pipes for supporting glass to be bent, said pipes being received by said recesses in said template plates and being supported by said template plates, at least one end of each of said pipes extending out of said oven through apertures in at least one wall of said oven; and lever means for urging said pipes back and forth to rock said pipes in said recesses while glass to be bent is lowered on said pipes.

2. A glass bending mold according to claim 1, wherein said lever means moves each of said pipes no more than about 20 mm.

3. A glass bending mold according to claim 2, wherein said lever means is located outside of said oven.

4. A glass bending mold according to claim 1, wherein said lever means is located outside of said oven.

5. A glass bending mold according to claim 1, wherein said at least one wall of said oven is heat insulated and can be removed from said oven with said pipes while said pipes extend through said at least one wall.

* * * * *